J. ZIMMERMANN.

Assignor to H. M. RICHARDSON and G. McKEE.

REVERSIBLE HANDLE FOR CHILDREN'S CARRIAGES.

No. 9,955. Reissued Nov. 29, 1881.

Witnesses
Robert Everett
J. A. Rutherford

Inventor.
J. Zimmermann.
By James L. Norris
Atty.

N. PETERS. Photo-Lithographer, Washington, D. C.

UNITED STATES PATENT OFFICE.

JOHN ZIMMERMANN, OF CLEVELAND, OHIO, ASSIGNOR TO HENRY M. RICHARDSON AND GEORGE McKEE, BOTH OF BOSTON, MASSACHUSETTS.

REVERSIBLE HANDLE FOR CHILDREN'S CARRIAGES.

SPECIFICATION forming part of Reissued Letters Patent No. 9,955, dated November 29, 1881.

Original No. 155,847, dated October 13, 1874. Application for reissue filed April 14, 1881.

*To all whom it may concern:*

Be it known that I, JOHN ZIMMERMANN, a citizen of the United States, residing at Cleveland, in the county of Cuyahoga and State of Ohio, have invented certain new and useful Improvements in Reversible Handles for Children's Carriages, of which the following is a specification.

This invention relates to a detachable handle for children's carriages, and has for its object to enable the carriage to be readily arranged for use or placed in condition for storage or shipment, as required, and to permit the ready reversal of the handle for either drawing or pushing the carriage.

It consists in a child's carriage having a detachable and reversible handle, in combination with the running-gear and sockets and mechanism for fastening the handle to the sockets, the complete organization being adapted for the application and use of the handle at either end of the carriage.

To enable others to fully understand my invention, I will proceed to describe the same in detail, by the aid of the accompanying drawings, in which—

Figure 1:
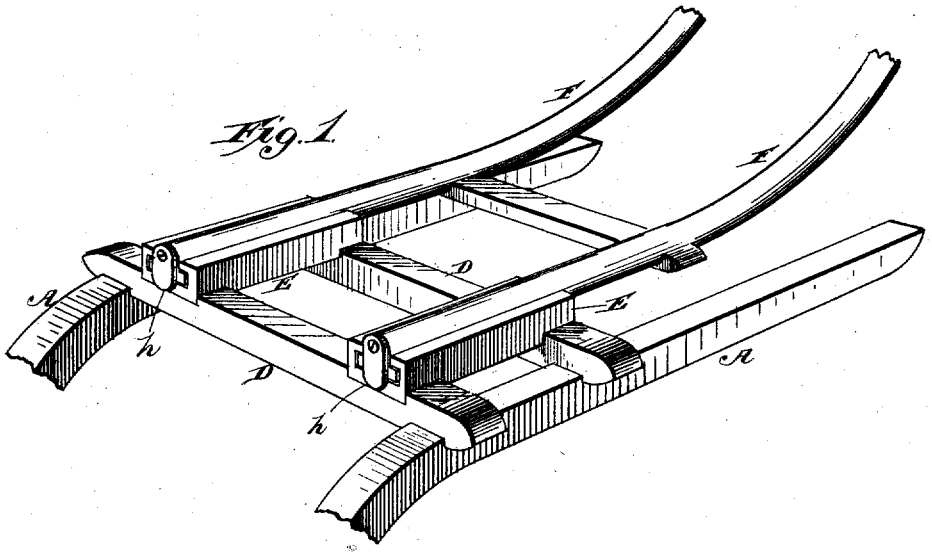
Figure 2:
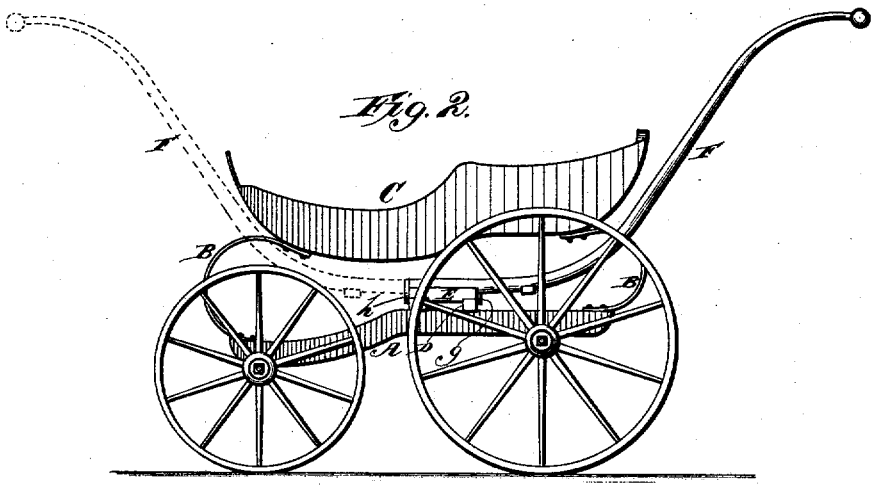

Figure 1 is a side elevation of a carriage embodying my improvement. Fig. 2 is a detached, enlarged, perspective view of a portion of the frame-work, showing the method of attaching the handle.

A, Figs. 1 and 2, represents the frame of the running part of a child's carriage, to which the springs B B are attached, which support the body C, and to which the axles are attached. At the central part of said frame are two cross-bars, D D, to which are secured two sockets, E E, consisting of grooved pieces placed lengthwise with the frame A.

F is the handle, made of the usual bent wood, at the lower ends of which, on the under side, is secured a plate which fits in the groove in the sockets. The said groove and plate are made straight or with parallel sides, so that the handle may be slipped into the said sockets from either end, as may be desired. A small pin or stop, *g*, on the under side of the handle, prevents the plate from sliding through the socket too far, and the handles have a button, *h*, on the end, which, when turned down, secures the handles in the sockets and prevents their being withdrawn.

By this means a cheap, simple, and ready method is given for reversing the handles of children's carriages, and all strain upon the body and springs by pulling, pushing, lifting, or depression of the handle is prevented.

By the ready removal and replacement of the handle the carriage may be either quickly arranged for use or placed in compact condition for storage or shipment.

I am aware that it is not broadly new to construct children's carriages with reversible handles, and hence I do not desire to claim such construction, broadly.

Having described my invention, I claim—

In a child's carriage, sockets connected with and sustained by the running-gear of the vehicle, in combination with a handle capable of being reversed from front to rear of the vehicle and mechanism for fastening the handle in said sockets, substantially as described, whereby the body of the vehicle is relieved from all strain due to the power applied to the handle in either position of the latter, as set forth.

In testimony whereof I have hereunto set my hand in the presence of two witnesses.

JOHN ZIMMERMANN.

Witnesses:
F. W. CADWELL,
C. D. O'CONNOR.